United States Patent Office 3,492,878
Patented Feb. 3, 1970

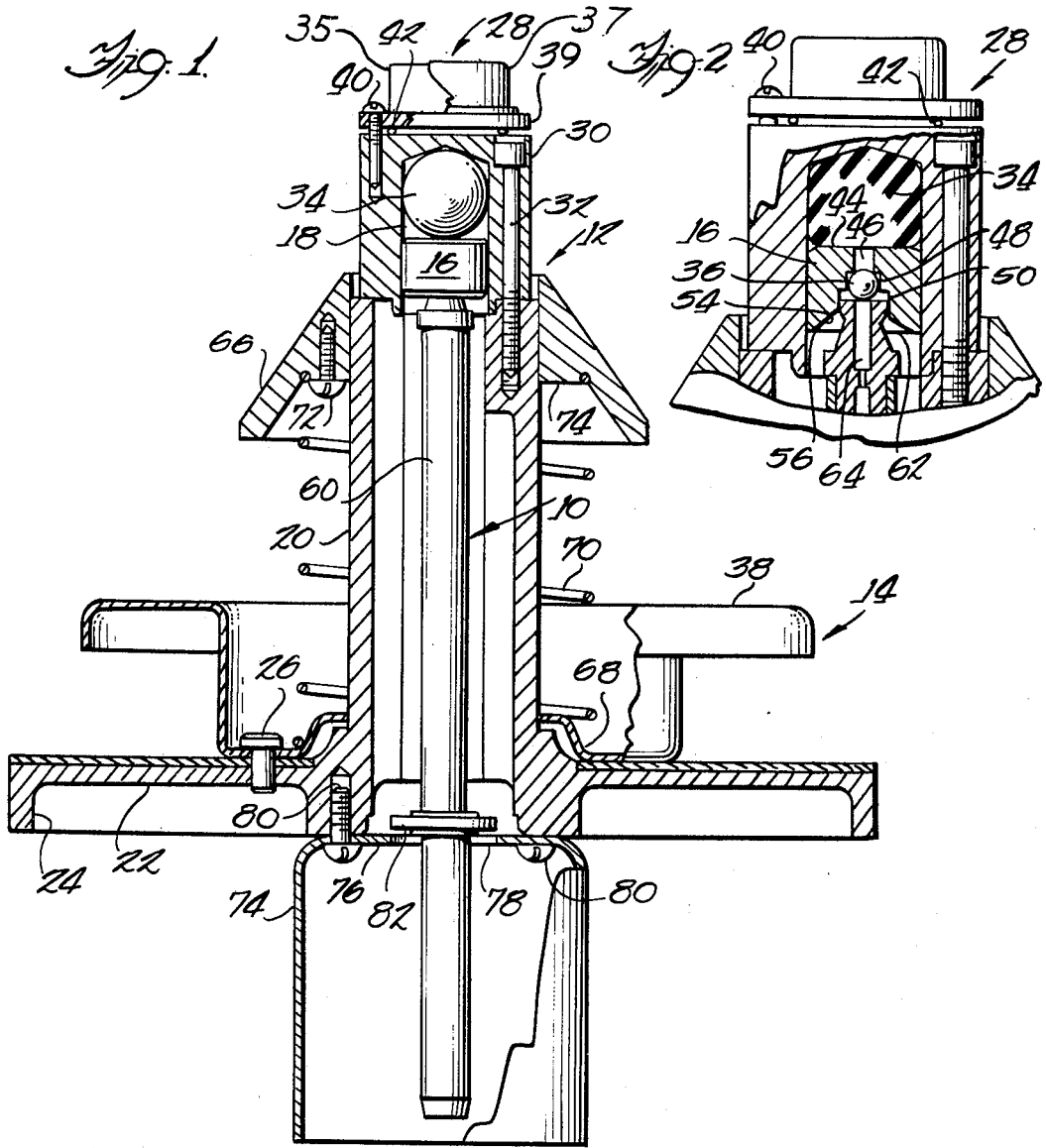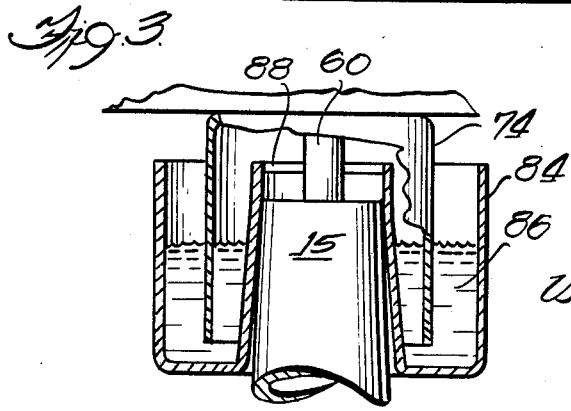

3,492,878
STATIC WHEEL BALANCER
Wallace F. Mitchell, Arlington Heights, Ill., assignor to Ammco Tools, Inc., North Chicago, Ill., a corporation of Illinois
Filed May 15, 1968, Ser. No. 729,186
Int. Cl. G01m 1/16
U.S. Cl. 73—485                                    7 Claims

ABSTRACT OF THE DISCLOSURE

The balancing head of the wheel balancer is pivotably supported on a pedestal by a ball bearing and pivot seat, with the pivot seat being pivotably supported by the ball bearing and forming an axially movable floor for a shock absorber compartment in the balancing head. A rubber ball is confined between the roof and the floor of the shock absorber compartment to support the balancing head. When a wheel is dropped on the carrier the rubber ball is compressed between the roof and movable floor of the shock absorber compartment and thereby causes a deceleration of the downward motion of the balancing head.

---

This invention relates to wheel balancers and more particularly to an apparatus for mounting the balancing head of a static wheel balancer.

In some static wheel balancers, a hard pivot supports a balancing head and wheel carrier upon a vertically disposed pedestal. The wheel carrier is adapted to support a wheel, including a tire, concentrically around the pivot on which the wheel, the carrier, and the balancing head are free to pivot out of a horizontal plane in any direction. A spirit level is mounted to the balancing head and indicates the amount of tilting of the balancing head, which tilting is caused by one portion of the wheel being heavier than another portion when the wheel is not statically balanced. By observing the amount of tilting on the spirit level, an operator may attach weights to the wheel until the balancing head assumes a horizontal position, thereby indicating that the wheel is statically balanced.

Static wheel balancers that include a hard pivot generally also include some mechanism for preventing the pivot from being damaged from shocks or impulse loads imposed upon it when a wheel is dropped in place upon the static wheel balancer for balancing.

One prior art provision for protecting the pivot from damage as the wheel is dropped upon the static wheel balancer comprises a spring mounted in such a position that it absorbs the shock caused by a wheel falling upon the static wheel balancer and thereby affords some protection to the pivot. The use of springs to cushion the shock of dropping a wheel on the static wheel balancer has some disadvantages.

One disadvantage is that inaccuracies result because the balancing head pivots on the spring as well as on the pivot. The freedom to pivot on the spring is restrained to a different degree depending on the amount the spring is compressed and this causes the amount of tilting to depend to some extent on the weight of the wheel rather than only upon the amount of static imbalance of the wheel.

Another disadvantage is that it is difficult to fabricate springs which impart the proper deceleration to wheels when they are placed upon the wheel balancing unit. Generally, a spring is either so stiff that it imparts too much shock to the pivot when the wheel is initially placed upon the wheel balancer or else it is not sufficiently stiff enough after the spring has been compressed and the wheel bottoms, imparting excessive shock to the pivot.

Another prior art provision for cushioning the shock imparted to the pivot when a wheel is placed upon a wheel balancer is the incorporation of both a spring and a fluid dampener into the balancing head so that both the spring and the fluid dampener absorb some of the shock. The fluid dampener includes a perforated compartment within a fluid container. When the wheel is placed upon the wheel balancer, it drives a piston that tightly engages the inner wall of the perforated compartment downward forcing fluid through the perforations into the fluid container. As the piston moves downward in the perforated compartment, it covers more of the perforations so that there are fewer available for the expulsion of the fluid into the fluid container. This causes an increased resisting force to be applied by the fluid as the piston moves downward and thereby increases the deceleration.

Prior art wheel balancers that utilize the combination of a spring and a fluid dampener to cushion the shock upon a pivot when a wheel is placed on the wheel balancer also have several disadvantages. One disadvantage is that the seals of the fluid compartment deteriorate in time and permit the fluid to escape. Another disadvantage is that this type of shock absorber for a wheel balancer is difficult to disassemble and assemble for purposes of repair. A still further disadvantage is that wheel balancers incorporating this type of shock absorber are somewhat inaccurate because the spring may not be completely depressed and therefore the balancing head pivots upon both the pivot and the spring resulting in a faulty calibration.

Accordingly, it is an object of this invention to provide an improved balancing apparatus.

It is a further object of this invention to provide an accurate wheel balancer.

It is a still further object of this invention to provide an improved wheel balancer which includes a provision for absorbing shock from the placing of a wheel upon the wheel balancer and the removal of the wheel therefrom.

It is a still further object of this invention to provide an improved shock absorber for wheel balancers which utilize a hard pivot.

In accordance with the above and further objects of the invention, a wheel balancer is provided having a pedestal, a pivot, a balancing head, and a wheel carrier. The pedestal includes a supporting shaft that is vertically mounted to the base of the wheel balancer and a tungsten carbide plug fitted into the upper end of the vertical supporting shaft. The pivot or fulcrum is a ball bearing that rests upon the tungsten carbide plug. The wheel carrier is mounted to the balancing head in a concentric relation to the vertical axis of the balancing head, which axis passes through the pivot.

The balancing head includes a pivot seat, a vertical column, a spirit level, a shock absorber chamber, and an elastomeric object such as a rubber ball positioned within the shock absorber chamber. The balancing head is mounted with the pivot seat being supported on the ball bearing above the tungsten carbide plug so that the wheel carrier and the balancing head pivot on the ball bearing. The pivot seat is axially movable within the shock absorber chamber, its top surface forming a movable floor therein. The vertical column supports the pivot seat, the shock absorber chamber, the spirit level and the wheel carrier.

An impact shock is imparted to the balancing head when a wheel is initially positioned on the wheel carrier. As the impact shock is imposed on the wheel carrier, the vertical column moves downward causing the elastomeric object to be compressed between the pivot seat and the roof of the shock absorber chamber. The elastomeric object absorbs the impact from the falling wheel and is compressed thereby, exerting an increasingly greater resisting force to the weight of the wheel as it is compressed. When the shock absorber chamber has been so reduced in volume that it is completely filled by the distorted elastomeric object, the shock absorber has bottomed.

The accuracy of the wheel balancer is unaffected by the shock absorber because the elastomeric object does not move and create another pivot point. Moreover, the elastomeric object has been found to exert a suitable resisting force to a wheel placed upon the wheel carrier, causing the proper rate of deceleration to protect the pivot. The shock absorber and pivot are easily assembled and disassembled and there are no fluids to leak from the shock absorber.

The above-noted and other features of the invention will be better understood from the following detailed description when considered with reference to the accompanying drawings in which:

FIGURE 1 is a fragmentary elevational view, partially in section, of a wheel balancer incorporating an embodiment of the invention;

FIGURE 2 is a vertical view, partially in section, of a portion of the balancing head of the wheel balancer of FIGURE 1; and FIGURE 3 is a sectional view of a dampening apparatus which may be incorporated with the balancing head of FIGURE 1.

GENERAL FEATURES

In FIGURE 1 an elevational view, partially in section, of a portion of a static wheel balancer that is an embodiment of the invention is shown having a pedestal 10, a balancing head 12, and a wheel carrier 14. The pedestal 10 is firmly mounted to the base 15 of the wheel balancer (FIGURE 3) from which it extends vertically and is pivotally coupled to the balancing head 12 at its upper end through a cylindrical pivot seat 16 mounted within the shock absorber chamber 18 of the balancing head 12.

The balancing head 12 includes a vertical column or sleeve 20 having a horizontal radial flange 22 with a cylindrical downturned edge 24. The wheel carrier 14 is bolted to the upper side of the cylindrical flange 22 by the bolts 26, one of which is shown, and has a flat, circular upper surface 38 for supporting the tire of a wheel that is to be statically balanced. A spirit level 28 is mounted to a cap piece 30 which is, in turn, fastened at the top of the column 20 by means of a bolt 32. The shock absorber chamber 18 is formed within the cap piece 30 and is closed on its bottom end by the cylindrical pivot seat 16, which operates as a piston to compress a highly resilient solid object 34 that is enclosed within the shock absorber chamber 18. The highly resilient solid object 34 may be a ball of a suitable elastomer such as natural rubber, neoprene and the like and will hereinafter be referred to as a rubber ball 34. The pivot seat 16 is pivotably supported by the ball bearing 36 (FIGURE 2).

GENERAL OPERATION OF THE WHEEL BALANCER

When a wheel including a tire is positioned on the tire supporting surface 38 of the wheel carrier 14, the balancing head 12 tilts about the ball bearing 36 with the heavier side of the wheel dropping unless the wheel is statically balanced. The amount of tilt of the wheel carrier 14 is indicated by the spirit level 28, and the operator may insert weights into the wheel in accordance with the indications on the spirit level 28 until the wheel is in static balance.

When the wheel is dropped onto the wheel carrier 14, it creates an impact load on the balancing head 12. This impact load causes the balancing head 12 to move downwardly which results in the cylindrical pivot seat 16 coming closer to the roof of the shock absorber chamber 18 by compressing the rubber ball 34. As the rubber ball 34 is compressed, it increases its resistive force to the shock imposed on the wheel carrier 14 in the downward direction by the falling wheel. This causes the motion of the balancing head to decelerate in an increasingly rapid manner as it moves downwardly with respect to the pedestal 10. The balancing head does not bottom unless the rubber ball 34 completely fills the shock absorber chamber 18 as shown in the sectional view in FIGURE 2.

The rubber ball does not move with respect to the shock absorber chamber 18 so there is only one place of pivoting which is on the ball bearing 36. The rubber ball does not move within the shock absorber chamber 18 because, as the ball is compressed within the chamber, it expands outwardly to tightly grasp the walls of the chamber 18 and to form a relatively rigid structure that includes the pivot seat 16 and the cap piece 30.

SPECIFIC DESCRIPTION

The spirit level 28 includes a cup-shaped compartment 35 containing the spirit and bubble enclosed by a removable cap 37 and a supporting flange 39. It is spaced from the cap piece 30 by means of the O-ring 42 and held thereto by means of the bolts 40, one of which is shown in FIGURE 1.

The rubber ball 34 has a diameter of approximately ⅞ of an inch and a hardness characterized by a 50–60 durometer reading. As best shown in FIGURE 2, the cylindrical pivot seat 16 includes a flat upper surface 44 abutting the rubber ball 34 and has a bore 46 extending downwardly into two successively stepped counterbores 48 and 50. The ball bearing 36 fits within and is staked, fixedly in place by the shoulder of the smaller counterbore 48. Opening onto the flat bottom surface 56 of the pivot seat 16 is a cylindrical central aperture having a beveled edge 54 connecting the larger stepped counterbore 50 to the bottom surface of the cylindrical pivot seat.

The pedestal 10 includes a vertically extending supporting shaft 60 mounted at its lower end in the base of the wheel balancer and an adapter piece 62 attached at its upper end extending into the larger counterbore 50. A cylindrical tungsten carbide plug 64 is press fitted into the adapter and has its flat upward end engaging and supporting the ball bearing 36.

The balancing head 10 pivots freely on the ball bearing 36 which ball bearing is supported on the tungsten carbide plug 64 and is held within the stepped counterbore 48 of the cylindrical pivot seat 16 to serve as a pivot or fulcrum for the entire balancing head of the wheel balancer. When a tire is placed on the carrier 38, the chamber 18 is reduced in size by the motion of the cylindrical seat 16 into the chamber 18, compressing the rubber ball 34 until it resists with sufficient force to support the tire. The rubber ball 34 is distorted as it is compressed so that it expands outwardly engaging the walls of the shock absorber chamber 18 and grasping them tightly to form a rigid structure so that the only pivoting possible is around the ball bearing 36.

A centering cone 66 in the form of a truncated hollow cone is movably positioned around the vertical column 20 of the balancing head 12 and is supported on an inner flange 68 of the wheel carrier 14 by the helical compression spring 70. The helical compression spring 70 circumscribes the vertical column 20 and has its top end fastened to the inward cylindrical shoulder 74 of the centering cone 66 by means of the head of the screw 72, and has its bottom end fastened to the bottom flange 68 of the wheel carrier 14 by the head of one of the bolts 26 (not shown).

The centering cone 66 is free to move slightly in an axial direction around the vertical column 20 so that the wheel may be positioned over it and be centered by it before it drops on the tire engaging surface 38 of the wheel carrier 14. The spring 70 takes up some of the shock of the wheel dropping upon the centering cone 66.

A cylindrical skirt 74 circumscribes the supporting shaft 60 and includes a top closed end 76 having a central aperture 78 through which the supporting shaft 60 passes. The end 76 is fastened to the flange 22 of the cylindrical sleeve 20 by means of the screws 80, two of which are shown in FIGURE 1.

The cylindrical aperture 78 is sufficiently large to permit the balancing head 12 to tilt axially with respect to the supporting shaft 60, carrying the skirt 74 with it. The size of the aperture 78 controls the maximum tilt permissible since the supporting shaft 60 engages the end of the aperture 78 at an extreme end of the tilt preventing it from further motion in the same direction. A cylindrical disc 82 is mounted to the supporting shaft 60 above the aperture 68 and includes an outer cylindrical edge slightly larger in diameter than the aperture 78. The balancing head is limited in its upward movement by this disc which engages the top of the skirt 74 so that it inhibits bouncing of the balancing head on the rubber ball 34 when a wheel is dropped onto the wheel balancer.

In FIGURE 3 a sectional view of a dampening apparatus which may be used with an embodiment of the invention is shown having a toroidal shaped dampening pan 84 circumscribing the base 15 of the wheel balancer into which the supporting shaft 60 is inserted through the torus center 88 and being held to the base 15 by any suitable means. The cylindrical skirt 74 extends downwardly into the toroidal shaped dampening pan.

The toroidal shaped dampening pan 84 is filled with dampening oil 86 which slows the movement of the balancing head. This dampening pan 84 may be used on wheel balancers that are to be operated in the field under conditions which cause the metal to metal contact between the ball bearing 36, the tungsten carbide plug 64 and the cylindrical pivot seat 16 to otherwise be too sensitive.

SUMMARY

The wheel carrier 14 and the spirit level 28 are attached to the balancing head 12 of the wheel balancer and this assembly is pivotally supported on the vertically extending pedestal 10 by the ball bearing 36 which rests on a tungsten carbide plug 64 attached to the staff 60. An axially movable cylindrical pivot seat 16 within a cylindrical shock absorber chamber 18 rests upon the ball bearing 36 and supports the balancing head through a rubber ball 34. The rubber ball 34 is confined by the shock absorber chamber 18 and separates the flat upper surface of the cylindrical pivot seat 16 from the roof of the shock absorber chamber 18.

When a wheel is dropped upon the wheel carrier 14, the impact from the dropping of the wheel causes the rubber ball 34 to be compressed within the chamber 18 as the balancing head 12 moves downward with respect to the cylindrical pivot seat 16. As the rubber ball 34 is compressed, it resists the downward movement with an increasing force and cushions the shock upon the ball bearing 36 and its contacting surfaces on the counterbore 48 and the tungsten carbide plug 64. This prevents damage to the surfaces of the counterbore 48, the plug 64, and the ball bearing 36.

When the balancing head 12 comes to rest after having the wheel placed upon the wheel carrier 14, the balancing head 12 and pivot seat 16 form a unitary structure caused by the expansion of the rubber ball 34 against the sides of the chamber 18 and the frictional contact with the top surface 44 of the pivot seat 16. Because the pivot seat 16, and balancing head 12 are held together, pivotal motion can only occur about the ball bearing 36 and cannot occur within the shock absorbing chamber 18. This increases the accuracy of the wheel balancer.

Besides increasing the accuracy of the wheel balancer and having a superior shock absorbing ability, the shock absorber of this invention forms an economically constructed combination with the other elements of the wheel balancer. All of its parts are simple and inexpensive. Moreover, it can be easily disassembled from the wheel balancer and it contains no fluids to leak from it.

Although an embodiment of this invention has been described in detail, many modifications and variations are possible in the light of the above teachings. It is therefore to be understood that, within the scope of the appending claims, the invention may be practiced otherwise than as specifically described.

What is claimed is:

1. A balancing mechanism comprising:
a supporting structure including a pedestal;
a reference structure including a spirit level and a wheel carrier adapted to have a wheel positioned thereon,
a pivot supported by said pedestal;
said reference structure including a pivot seat and being pivotally supported on said supporting structure by said pivot;
a shock absorber;
said shock absorber comprising a compartment having a movable wall and an elastomeric ball within said compartment;
said movable wall being integrally connected with said pivot seat, and
means for moving said movable wall portion into said compartment as said reference structure is moved with respect to said supporting structure,
said compartment, said pivot and said spirit level being mounted in mutual alignment.

2. A balancing mechanism comprising:
a supporting structure including a vertically mounted pedestal;
an adapter having a tungsten carbide plug therein mounted on the upper end of said pedestal;
a pivot including a bearing ball positioned on said tungsten carbide plug;
a shock absorber comprising a compartment having a movable wall and an elastomeric ball within said compartment;
said movable wall comprising a seat pivotally supported by said bearing ball on said adapter;
a reference structure including a wheel carrier circumferentially mounted around said pedestal and pivotally supported on said supporting structure by said pivot;
said compartment of said shock absorber being within said reference structure above said pedestal and pivot seat; and
a spirit level mounted on said reference structure in line with said shock absorber and said adapter,
whereby said reference structure is moved downward when a wheel is placed on said wheel carrier causing said elastomeric ball to be compressed between the upper end of said movable wall and the other walls of said compartment.

3. A balancing mechanism according to claim 2 further comprising a centering cone circumferentially mounted around said pedestal and a compression spring supported by said reference structure and resiliently supporting said centering cone.

4. A balancing mechanism according to claim 3 in which said reference structure further includes a tubular sleeve connecting said shock absorber and said wheel carrier, said centering cone circumscribing said sleeve.

5. A balancing mechanism according to claim 4 further including a tubular skirt circumscribing said pedestal beneath said sleeve and connected thereto, said tubular skirt having a partially closed upper end through which said pedestal passes.

6. A balancing mechanism according to claim 5 in which the internal edges of the partially closed upper end of said skirt forms an aperture through which said pedestal passes and said pedestal includes a disc adjacent to said aperture circumscribing said pedestal and having an outer diameter slightly larger than the diameter of said aperture.

7. A balancing mechanism according to claim 5 further including a toroidal pan affixed to said supporting structure and dampening oil within said toroidal pan, said skirt extending into said oil.

References Cited

UNITED STATES PATENTS 2,220,404  11/1940  Hulslander _____ 73—485
3,055,221   9/1962  Bageman et al. _____ 73—484
3,289,483  12/1966  Slemmons _____ 73—484

FOREIGN PATENTS 750,987   6/1956  Great Britain.

RICHARD C. QUEISSER, Primary Examiner
J. K. LUNSFORD, Assistant Examiner